US009816022B2

(12) United States Patent
Chung et al.

(10) Patent No.: US 9,816,022 B2
(45) Date of Patent: Nov. 14, 2017

(54) AMPHOLYTE POLYMERIC COMPOUNDS IN SUBTERRANEAN APPLICATIONS (71) Applicant: Halliburton Energy Services, Inc., Houston, TX (US)

(72) Inventors: HsinChen Chung, Houston, TX (US); Yuntao Thomas Hu, The Woodlands, TX (US); Xiangnan Ye, Cypress, TX (US); Narongsak Tonmukayakul, Spring, TX (US); Michael A. McCabe, Duncan, OK (US); Kevin Walter Frederick, Evans City, PA (US); Shih-Ruey Tom Chen, Pittsburgh, PA (US); Randy Jack Loeffler, Carnegie, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 499 days.

(21) Appl. No.: 13/929,835

(22) Filed: Jun. 28, 2013

(65) Prior Publication Data
US 2014/0352960 A1 Dec. 4, 2014

Related U.S. Application Data (60) Provisional application No. 61/829,609, filed on May 31, 2013.

(51) Int. Cl.
*C09K 8/588* (2006.01)
*C09K 8/12* (2006.01)
(Continued)

(52) U.S. Cl.
CPC ............. *C09K 8/12* (2013.01); *C04B 24/163* (2013.01); *C04B 28/02* (2013.01); *C09K 8/035* (2013.01);
(Continued)

(58) Field of Classification Search
CPC ..................................................... C09K 8/588
See application file for complete search history.

(56) References Cited

U.S. PATENT DOCUMENTS 4,330,450 A * 5/1982 Lipowski .................. C02F 1/54
162/168.1
4,460,627 A * 7/1984 Weaver ..................... C09K 8/50
427/212

(Continued)

FOREIGN PATENT DOCUMENTS

| CN | 101429427 | 5/2009 |
| WO | 01/06999 | 2/2001 |
| WO | 01-06999 A1 | 2/2001 |

OTHER PUBLICATIONS

International Search Report and Written Opinion for PCT/US2014/039570 dated Sep. 18, 2014.
International Search Report and Written Opinion for PCT/US2014/039368 dated Oct. 8, 2014.
Office Action received in corresponding Polish Application No. P-414671, dated Mar. 26, 2016.
Office Action received in corresponding Polish Application No. P-414670, dated Mar. 26, 2016.

*Primary Examiner* — Angela M DiTrani
*Assistant Examiner* — Andrew H Sue-Ako
(74) *Attorney, Agent, or Firm* — McDermott Will & Emery LLP (57) ABSTRACT Ampholyte polymeric compound that comprises at least one nonionic monomer, at least one sulfonic acid-containing monomer, and at least one cationic monomer may be useful in viscosifying treatment fluids for use in subterranean operations at a concentration of about 0.5 v/v % to about 30 v/v % of the treatment fluid. Such operations may involve introducing the treatment fluid into a wellbore penetrating a subterranean formation optionally at a pressure sufficient to create or extend at least one fracture in the subterranean formation.

8 Claims, 4 Drawing Sheets (51) Int. Cl.

| | |
|---|---|
| *E21B 43/16* | (2006.01) |
| *C09K 8/36* | (2006.01) |
| *C09K 8/64* | (2006.01) |
| *C09K 8/82* | (2006.01) |
| *C09K 8/68* | (2006.01) |
| *C09K 8/72* | (2006.01) |
| *C09K 8/88* | (2006.01) |
| *C04B 24/16* | (2006.01) |
| *C04B 28/02* | (2006.01) |
| *C09K 8/035* | (2006.01) |
| *C09K 8/42* | (2006.01) |
| *C09K 8/467* | (2006.01) |
| *C09K 8/512* | (2006.01) |
| *C09K 8/52* | (2006.01) |
| *C09K 8/62* | (2006.01) |
| *C09K 8/80* | (2006.01) |
| *E21B 43/26* | (2006.01) |
| *C09K 8/74* | (2006.01) |
| *C09K 8/76* | (2006.01) |
| *C04B 103/00* | (2006.01) |

(52) U.S. Cl.
CPC ............... *C09K 8/36* (2013.01); *C09K 8/42* (2013.01); *C09K 8/467* (2013.01); *C09K 8/512* (2013.01); *C09K 8/52* (2013.01); *C09K 8/588* (2013.01); *C09K 8/62* (2013.01); *C09K 8/64* (2013.01); *C09K 8/68* (2013.01); *C09K 8/725* (2013.01); *C09K 8/74* (2013.01); *C09K 8/76* (2013.01); *C09K 8/80* (2013.01); *C09K 8/82* (2013.01); *C09K 8/882* (2013.01); *C09K 8/887* (2013.01); *E21B 43/16* (2013.01); *E21B 43/26* (2013.01); *C04B 2103/0062* (2013.01); *C09K 2208/28* (2013.01)

(56) References Cited

U.S. PATENT DOCUMENTS

| | | | |
|---|---|---|---|
| 4,484,631 A * | 11/1984 | Sherwood | C02F 5/12 166/294 |
| 4,726,906 A | 2/1988 | Chen et al. | |
| 4,982,793 A | 1/1991 | Holtmyer et al. | |
| 5,032,295 A | 7/1991 | Matz et al. | |
| 5,067,565 A | 11/1991 | Holtmyer et al. | |
| 5,122,549 A | 6/1992 | Holtmyer et al. | |
| 5,322,640 A | 6/1994 | Byrne et al. | |
| 5,609,862 A | 3/1997 | Chen et al. | |
| 5,879,670 A | 3/1999 | Melby et al. | |
| 6,281,172 B1 | 8/2001 | Warren et al. | |
| 6,482,776 B1 * | 11/2002 | Matz et al. | 507/120 |
| 7,004,254 B1 | 2/2006 | Chatterji et al. | |
| 7,271,134 B2 | 9/2007 | King et al. | |
| 7,427,583 B2 | 9/2008 | Couillet et al. | |
| 7,482,310 B1 | 1/2009 | Reese et al. | |
| 7,579,302 B2 | 8/2009 | McMechan et al. | |
| 2003/0008779 A1 * | 1/2003 | Chen et al. | 507/200 |
| 2003/0155122 A1 | 8/2003 | Chang et al. | |
| 2004/0040708 A1 | 3/2004 | Stephenson et al. | |
| 2009/0050320 A1 * | 2/2009 | Collins | E21B 43/20 166/266 |
| 2009/0105097 A1 | 4/2009 | Abad et al. | |
| 2009/0209438 A1 | 8/2009 | Thieme et al. | |
| 2010/0307752 A1 * | 12/2010 | Rey et al. | 166/305.1 |
| 2014/0352962 A1 * | 12/2014 | Chung | C09K 8/588 166/280.2 |
| 2014/0352969 A1 * | 12/2014 | Chung | C09K 8/12 166/308.3 |
| 2014/0367108 A1 * | 12/2014 | Chung | C09K 8/74 166/307 |

* cited by examiner

AMPHOLYTE POLYMERIC COMPOUNDS IN SUBTERRANEAN APPLICATIONS

CROSS-REFERENCE TO RELATED APPLICATIONS

This application claims priority to U.S. Provisional Patent Application No. 61/829,609 filed May 31, 2013 entitled "Ampholyte Polymeric Compounds in Subterranean Applications."

BACKGROUND

At least some of the exemplary embodiments described herein relate to methods of using ampholyte polymeric compounds as gelling agents in subterranean operations, and treatment fluid compositions relating thereto.

Viscosified treatment fluids are used in many subterranean operations. For example, in fracturing and gravel packing operations, viscosified treatment fluids may be used to suspend and transport particulates to a desired location in a wellbore penetrating the subterranean formation and/or the subterranean formation, so as to form a particulate pack therein (e.g., a proppant pack or a gravel pack). In other instances, viscosified treatment fluids may act to transfer hydraulic pressure in a fracturing operation or to prevent undesired leak-off of fluids into the subterranean formation in a variety of subterranean operations. In many instances, during or after the operation the viscosified treatment fluid is broken (i.e., treated to reduce the viscosity of the treatment fluid) so that the fluid may be more effectively and efficiently removed from the wellbore or formation.

However, the use of polymers in treatment fluids has several drawbacks. For example, polymers, especially high molecular weight polymers, may have a tendency to remain in the formation and plug pores, thereby reducing the productivity of the well. To address this, breakers are used to decrease the viscosity of the fluid (e.g., via polymer or crosslinker degradation), so that flowback operations can be conducted to recover the polymer or degradation products thereof. In many instances, the breakers are introduced in separate treatments, which increase the complexity, cost, and time associated with subterranean operations. In some instances, the breakers may be included in the initial treatment fluid with the polymer. Such breakers are generally engineered to delay breaking (e.g., via encapsulation or chemical modification), which increases the cost of developing and producing the delayed breaker.

Further, some polymer systems used for viscosification do not break cleanly and leave behind insoluble residues of polymers or unbroken gel clumps, which impair the conductivity of the formation. For example, guar gum (a widely used viscosifying agent) is known for its considerable amount of insoluble solids remaining on a proppant pack even after the breaker treatment.

Accordingly, a need exists for polymers that are effective with fluids having increased salinity and that are capable of being degraded, preferably without the need for a subsequent operation.

BRIEF DESCRIPTION OF THE DRAWINGS

The following figures are included to illustrate certain aspects of the exemplary embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

At least some of the exemplary embodiments described herein relate to methods of using ampholyte polymeric compounds as gelling agents in subterranean operations, and treatment fluid compositions relating thereto.

As used herein, the term "ampholyte" refers to a compound having both a positive and a negative charge. The ampholyte polymeric compounds described herein include nonionic monomers, cationic monomers, and sulfonic acid-containing monomers.

The ampholyte polymeric compounds described herein are suitable for gelling treatment fluids, including in high TDS treatment fluids (e.g., treatment fluids with saltwater or brackish water base fluids). In some instances, with higher TDS treatment fluids, the ampholyte polymeric compounds may be included at higher concentrations. As used herein, total dissolved solids ("TDS") refers to the sum of all minerals, metals, cations, and anions dissolved in water, as opposed to suspended solids that can be separated from treatment fluids via filtration.

Further, the ampholyte polymeric compounds described herein may advantageously break over time with the use of little or no breaker. Without being limited by theory, it is believed that, at least some of the monomeric units of the ampholyte polymeric compounds may at least partially hydrolyze, which in turn may cause the ampholyte polymeric compound to contract and reduce its viscosifying effect. As used herein, the terms "partially hydrolyze," "partially hydrolysis," and the like refer to hydrolysis of at least some of the monomeric units of a polymeric compound (e.g., ampholyte polymeric compounds described herein). Partial hydrolysis and polymeric contraction of an ampholyte polymeric compound described herein may advantageously allow wellbore operations to be performed with minimal amounts of breaker in the treatment fluid and/or without the need for a subsequent breaking treatment (and perhaps in some instances, without any breaker or need for subsequent breaking treatments), which reduces the cost and time associated with the wellbore operations.

The combination of these performance advantages may allow wellbore operations to be performed with a wider variety of treatment fluid compositions and to be performed without minimal to no breaker, thereby reducing costs while expanding functionality.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

The treatment fluids described herein comprise a base fluid and an ampholyte polymeric compound.

Ampholyte polymeric compounds suitable for use in conjunction with the treatment fluids and methods described herein may include at least one nonionic monomer, at least one cationic monomer, and at least one sulfonic acid-containing monomer.

Suitable nonionic monomers may include, but are not limited to, acrylamide. In some embodiments, the ampholyte polymeric compounds described herein may include nonionic monomers in an amount ranging from a lower limit of about 30%, 33%, 35%, or 40% by weight of the ampholyte polymeric compound to an upper limit of about 50%, 47%, 45%, or 40% by weight of the ampholyte polymeric compound, and wherein the amount of nonionic monomer may range from any lower limit to any upper limit and encompasses any subset therebetween.

Suitable sulfonic acid-containing monomers may include, but are not limited to, 2-acrylamido-2-methylpropane sulfonic acid, a salt thereof (e.g., the sodium salt of 2-acrylamido-2-methylpropane sulfonic acid), and any combination thereof. In some embodiments, the ampholyte polymeric compounds described herein may include sulfonic acid-containing monomers in an amount ranging from a lower limit of about 5%, 6%, 8%, or 10% by weight of the ampholyte polymeric compound to an upper limit of about 15%, 14%, 12%, or 10% by weight of the ampholyte polymeric compound, and wherein the amount of sulfonic acid-containing monomer may range from any lower limit to any upper limit and encompasses any subset therebetween.

Suitable cationic monomers may include, but are not limited to, acryloyloxy ethyl trimethyl ammonium chloride, methacrylamidopropyltrimethyl ammonium chloride, and any combination thereof. In some embodiments, the ampholyte polymeric compounds described herein may include cationic monomers in an amount ranging from a lower limit of about 40%, 42%, 45%, or 50% by weight of the ampholyte polymeric compound to an upper limit of about 60%, 57%, 55%, or 50% by weight of the ampholyte polymeric compound, and wherein the amount of cationic monomer may range from any lower limit to any upper limit and encompasses any subset therebetween.

In some embodiments, the ampholyte polymeric compounds described herein may have a weight average molecular weight ranging from a lower limit of about 2,000,000, 5,000,000, or 10,000,000 to an upper limit of about 20,000,000, 15,000,000, or 10,000,000, and wherein the weight average molecular weight may range from any lower limit to any upper limit and encompasses any subset therebetween. Those of ordinary skill in the art will recognize that ampholyte polymeric compounds having molecular weights outside the listed range may be suitable for viscosifying a treatment fluid described herein.

In some embodiments, the ampholyte polymeric compounds may be included in the treatment fluid in an amount ranging from a lower limit of about 0.5 v/v %, 1 v/v %, 2 v/v %, 5 v/v %, 8 v/v %, or 10 v/v % of the ampholyte polymeric compounds to the treatment fluid to an upper limit of about 30 v/v %, 20 v/v %, or 10 v/v % of the ampholyte polymeric compounds to the treatment fluid, and wherein the concentration may range from any lower limit to any upper limit and encompasses any subset therebetween. One skilled in the art with the benefit of this disclosure should recognize that the concentration of the ampholyte polymeric compounds may depend on, inter alia, the composition of the ampholyte polymeric compounds, the molecular weight of the ampholyte polymeric compounds, the composition of the base fluid, the other components of the treatment fluid (e.g., inclusion of a gelling agent or gas with foaming agent), the TDS of the treatment fluid, and the like, and any combination thereof.

Suitable base fluids for use in conjunction with the methods described herein may include, but not be limited to, aqueous-based fluids or oil-in-water emulsions, wherein the ampholyte polymeric compound is in the aqueous portion of the base fluid.

Suitable aqueous-based fluids (or water phases of an emulsion) may include fresh water, saltwater (e.g., water containing one or more salts dissolved therein), brine (e.g., saturated salt water), seawater, and any combination thereof. In some embodiments, the aqueous-based fluid may further comprise aqueous-miscible fluids, which may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, and any combination thereof. One of ordinary skill in the art, with the benefit of this disclosure, should recognize that higher concentrations of some aqueous-miscible fluids may cause the ampholyte polymeric compound described herein to precipitate or flocculate. As such, aqueous-miscible fluids may, in some embodiments, be included in the treatment fluids described herein at a low concentration.

Suitable oil phases for an oil-in-water emulsion may include, but are not limited to, an alkane, an olefin, an aromatic organic compound, a cyclic alkane, a paraffin, a diesel fluid, a mineral oil, a desulfurized hydrogenated kerosene, and any combination thereof.

The treatment fluids described herein may be useful in transporting particulates within or into a wellbore and/or subterranean formation. In some embodiments, the treatment fluids described herein may comprise a base fluid, ampholyte polymeric compounds, and a plurality of particulates. It should be understood that the term "particulate," as used in this disclosure, includes all known shapes of materials, including substantially spherical materials, fibrous materials, polygonal materials (such as cubic materials), and any combination thereof.

Suitable particulates for use in conjunction with the fluids sand methods described herein may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the exemplary embodiments described herein. In particular embodiments, preferred mean particulates size distribution ranges are one or more of 6/12, 8/16, 12/20, 16/30, 20/40, 30/50, 40/60, 40/70, or 50/70 mesh.

In some embodiments, the particulates may be present in the treatment fluids in an amount ranging from a lower limit of about 0.5 pounds per gallon ("ppg"), 1 ppg, or 5 ppg by volume of the treatment fluid to an upper limit of about 30 ppg, 20 ppg, or 10 ppg by volume of the treatment fluid, and wherein the amount may range from any lower limit to any upper limit and encompasses any subset therebetween.

In some embodiments, the treatment fluids described herein may optionally further comprise additives. Suitable additives may include, but are not limited to, weighting agents, inert solids, fluid loss control agents, emulsifiers, dispersion aids, corrosion inhibitors, emulsion thinners, emulsion thickeners, surfactants, lost circulation materials, pH control additives, breakers, biocides, crosslinkers, stabilizers, chelating agents, scale inhibitors, gas hydrate inhibitors, mutual solvents, oxidizers, reducers, clay stabilizing agents, friction reducing agents, and the like, and any combination thereof. One of ordinary skill in the art should understand which additives and at what concentration should be included in the treatment fluid for use in a desired method. By way of nonlimiting example, weighting agents may be included in the treatment fluids described herein to increase the density of the treatment fluid in applications like gravel packing.

In some embodiments, the treatment fluids comprising the ampholyte polymeric compounds may be useful in a plurality of subterranean operations where a gelled treatment fluid is desired for stimulation operations (e.g., fracturing treatments, acidizing treatments, or fracture acidizing treatments) and completion operations.

In some embodiments, a treatment fluid described herein may be used for a fracturing operation that rely on the viscosity of the treatment fluid for formation fracturing, fracture propagation, and proppant transport. Some embodiments may involve introducing a first treatment fluid into a wellbore penetrating a subterranean formation at a pressure sufficient to create or extend at least one fracture in the subterranean formation; and forming a particulate pack in the fracture with a second treatment fluid comprising a plurality of particulates, wherein at least one of the first and second treatment fluids comprise ampholyte polymeric compounds described herein. For example, in some embodiments, the first and/or second treatment fluid may comprise a base fluid, ampholyte polymeric compounds, and optionally additives, wherein the second treatment fluid further comprises a plurality of particulates.

In some embodiments, a treatment fluid described herein may be used in sand control operations (e.g., gravel pack). Some embodiments may involve introducing a treatment fluid that comprises a base fluid, ampholyte polymeric compounds, a plurality of particulates, and optionally additives into a wellbore penetrating a subterranean formation; and forming a particulate pack in an annulus within the wellbore with the plurality of particles.

Some embodiments (e.g., the fracturing or gravel packing embodiments disclosed herein) may further involve breaking the treatment fluid comprising the ampholyte polymeric compounds. In some instances, breaking may be achieved by partially hydrolyzing the ampholyte polymeric compounds. Partial hydrolysis (or breaking) may be achieved by increasing the temperature, increasing the pH, or both.

In some instances, breaking may be achieved by exposure to the elevated temperatures in the wellbore and/or subterranean formation. For example, the bottom hole circulating temperature may be about 100° F. or greater (e.g., about 100° F. to about 200° F., about 120° F. to about 200° F., or about 150° F. to about 200° F.). The rate of breaking (or partial hydrolysis and contraction of the ampholyte polymeric compounds) may depend on the composition of the ampholyte polymeric compounds, the relative ratios of the monomers of the ampholyte polymeric compounds, the TDS of the treatment fluid, and the like. Therefore, in some instances, the methods may include breaking the treatment fluid comprising the ampholyte polymeric compounds with minimal to no chemical breaker (e.g., less than about 1% of a chemical breaker).

In various embodiments, systems configured for delivering the treatment fluids described herein to a downhole location are described. In various embodiments, the systems can comprise a pump fluidly coupled to a tubular, the tubular containing a treatment fluid comprising a base fluid and an ampholyte polymeric compound, wherein the ampholyte polymeric compound comprises at least one nonionic monomer, at least one sulfonic acid-containing monomer, and at least one cationic monomer, and wherein the ampholyte polymeric compound is present at about 0.5 v/v % to about 30 v/v % of the treatment fluid, The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 1:
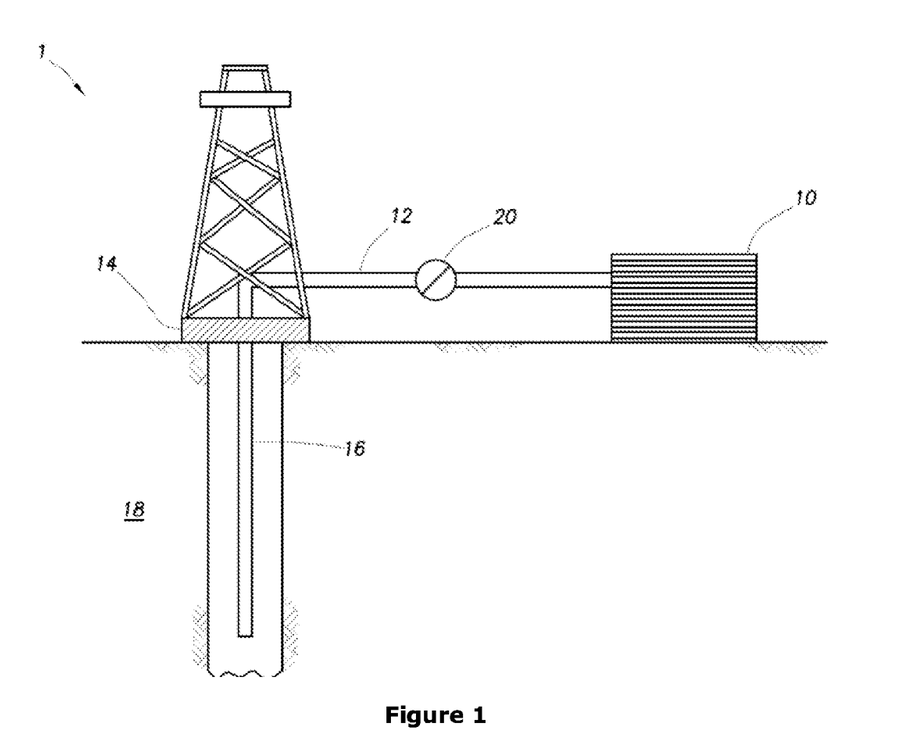
FIG. 1 provides an illustrative schematic of a system that can deliver treatment fluids of the present invention to a downhole location.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

In some instances, breaking may involve increasing the pH of the treatment fluid comprising the ampholyte polymeric compounds. Increasing the pH may be achieved by introducing a suitable breaking fluid or including a suitable breaker in the treatment fluid (e.g., sodium perborate).

Embodiments disclosed herein include:

A. a method that includes introducing a treatment fluid into a wellbore penetrating a subterranean formation, wherein the treatment fluid comprises a base fluid and an ampholyte polymeric compound, wherein the ampholyte polymeric compound comprises at least one nonionic monomer, at least one sulfonic acid-containing monomer, and at least one cationic monomer, and wherein the ampholyte polymeric compound is present at about 0.5 v/v % to about 30 v/v % of the treatment fluid;

B. a method that includes introducing a treatment fluid into a wellbore penetrating a subterranean formation at a pressure sufficient to create or extend at least one fracture in the subterranean formation, wherein the treatment fluid comprises a base fluid and an ampholyte polymeric compound, wherein the ampholyte polymeric compound comprises at least one nonionic monomer, at least one sulfonic acid-containing monomer, and at least one cationic monomer, and wherein the ampholyte polymeric compound is present at about 0.5 v/v % to about 30 v/v % of the treatment fluid; and C. a method that includes introducing a treatment fluid into a wellbore penetrating a subterranean formation, wherein the treatment fluid comprises a base fluid, an ampholyte polymeric compound at a viscosifying concentration, and a plurality of particulates, wherein the ampholyte polymeric compound comprises at least one nonionic monomer, at least one sulfonic acid-containing monomer, and at least one cationic monomer, and wherein the ampholyte polymeric compound is present at about 0.5 v/v % to about 30 v/v % of the treatment fluid; and forming a gravel pack comprising the particulates in an annulus within the wellbore.

Each of Embodiments A, B, and C may have one or more of the following additional elements in any combination: Element 1: the nonionic monomer being acrylamide; Element 2: the nonionic monomer being about 30% to about 50% by weight of the ampholyte polymeric compound; Element 3: the sulfonic acid-containing monomer being 2-acrylamido-2-methylpropane sulfonic acid or a salt thereof; Element 4: the sulfonic acid-containing monomer being about 5% to about 15% by weight of the ampholyte polymeric compound; Element 5: the sulfonic acid-containing monomer being acryloyloxy ethyl trimethyl ammonium chloride, methacrylamidopropyltrimethyl ammonium chloride, or a combination thereof; Element 6: the cationic monomer being about 40% to about 60% by weight of the ampholyte polymeric compound; Element 7: the method further including partially hydrolyzing the ampholyte polymeric compound; Element 8: the treatment fluid further comprising a plurality of particulates (unless otherwise provided for); Element 9: the base fluid being an oil-in-water emulsion; Element 10: the base fluid being an aqueous fluid; and Element 11: the ampholyte polymeric compound having a molecular weight of about 2,000,000 to about 20,000,000.

By way of non-limiting example, exemplary combinations applicable to Embodiments A, B, and C include: Element 1 in combination with Element 2; Element 3 in combination with Element 4; Element 5 in combination with Element 6; at least two of the foregoing in combination; at least one of Elements 7-11 in combination with the foregoing; and so on.

Further, Embodiment B may have one or more of the following additional elements: Element 12: the method further including forming a particulate pack in the fracture with a second treatment fluid that comprises a second base fluid, a second ampholyte polymeric compound at a viscosifying concentration, and a plurality of particulates; Element 13: Element 12 in combination with the second base fluid being the base fluid and the second ampholyte polymeric compound being the ampholyte polymeric compound; and Element 14: Element 12 or Element 13 in combination with partially hydrolyzing the second ampholyte polymeric compound.

Another embodiment described herein may be a method that includes introducing a treatment fluid into a wellbore penetrating a subterranean formation, wherein the treatment fluid comprises a base fluid and an ampholyte polymeric compound at about 0.5 v/v % to about 30 v/v % of the treatment fluid, the ampholyte polymeric compound comprising acrylamide monomer that is about 30% to about 50% by weight of the ampholyte polymeric compound, 2-acrylamido-2-methylpropane sulfonic acid monomer or a salt thereof that is about 5% to about 15% by weight of the ampholyte polymeric compound, and at least one cationic monomer that is about 40% to about 60% by weight of the ampholyte polymeric compound, wherein the cationic acid-containing monomer is acryloyloxy ethyl trimethyl ammonium chloride, methacrylamidopropyltrimethyl ammonium chloride, or a combination thereof.

While compositions and methods are described in terms of "comprising" various components or steps, the compositions and methods can also "consist essentially of" or "consist of" the various components and steps. When "comprising" is used in a claim, it is open-ended.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

The embodiments disclosed herein are illustrative. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

To facilitate a better understanding of the exemplary embodiments described herein, the following examples of preferred or representative embodiments are given. In no way should the following examples be read to limit, or to define, the scope of the exemplary embodiments described herein.

EXAMPLES

Example 1

Figure 2:
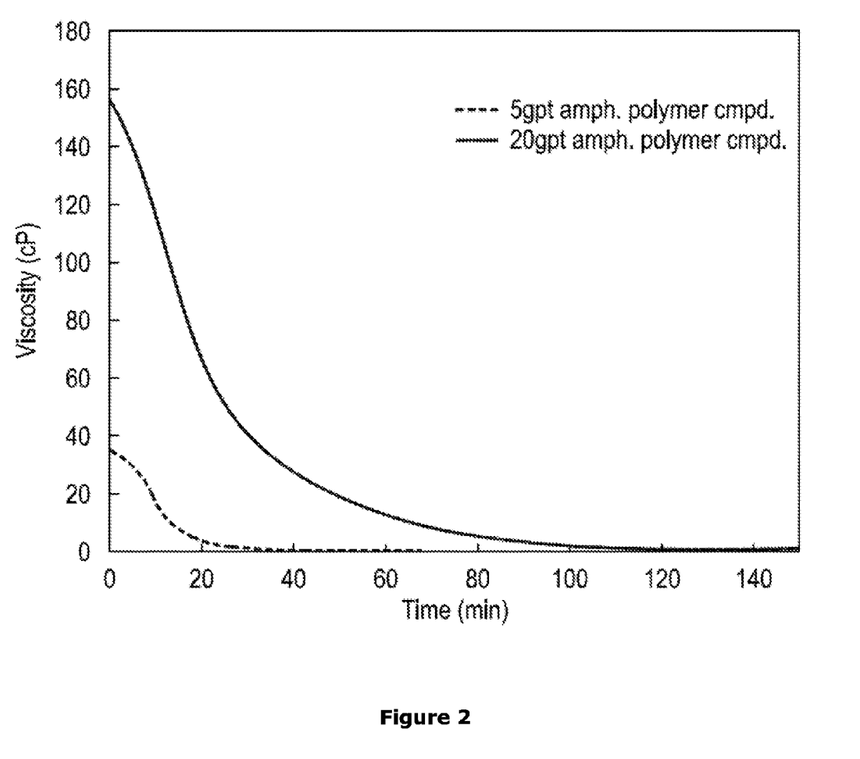
FIG. 2 provides a graph of the viscosity of an ampholyte polymeric compound at various concentrations over time at an elevated temperature.

Two samples of an ampholyte polymeric compound comprising a terpolymer of acrylamide, 2-acrylamido-2-methylpropane sulfonic acid, and acryloyloxy ethyl trimethyl ammonium chloride in water were prepared at 5 gal/1,000 gal and 20 gal/1,000 gal. The samples were heated from 77° F. to 150° F. at a rate of 10° F./min and then held at a constant temperature of 150° F. at a shear rate of 40 s$^{-1}$. As shown in FIG. 2, the viscosity at the higher concentration reduces from about 155 cP to less than about 5 cP in about 90 minutes, while at the lower concentration from about 35 cP to less than about 5 cP in about 20-25 minutes.

This example illustrates that treatment fluids comprising the ampholyte polymeric compounds described herein reduce in viscosity over time (i.e., break over time), which may advantageously allow for the use of little to no breaker in the treatment fluids or in subsequent wellbore operations.

Example 2

Figure 3:
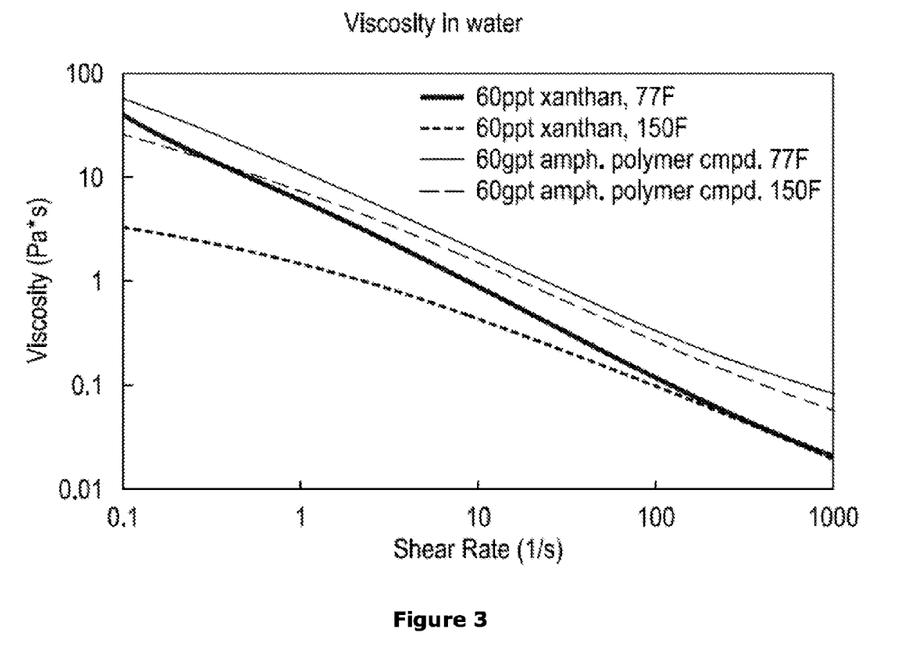
FIG. 3 provides a graph comparing the viscosity of an ampholyte polymeric compound and a traditional viscosifier in water.
Figure 4:
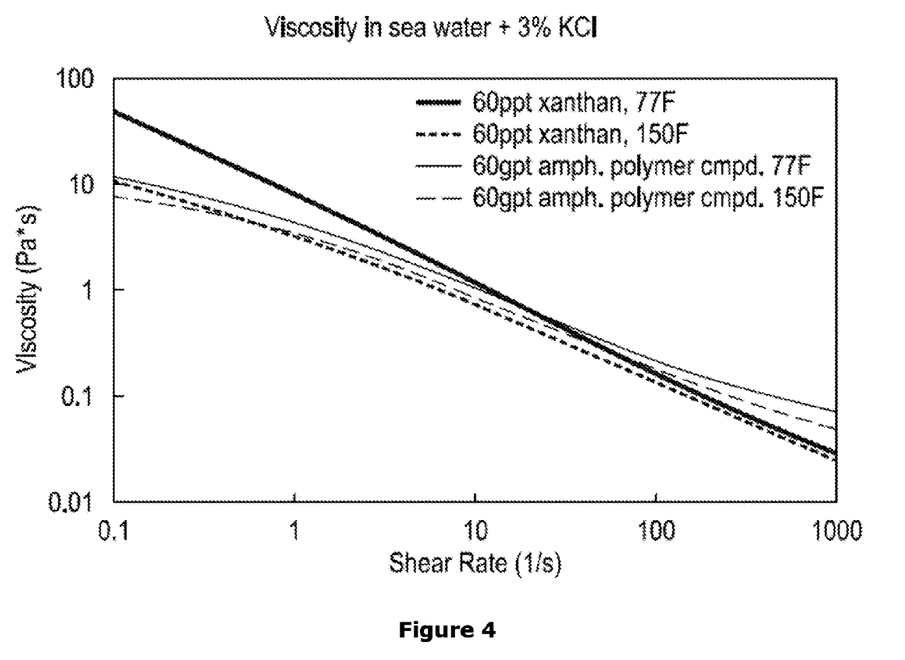
FIG. 4 provides a graph comparing the viscosity of an ampholyte polymeric compound and a traditional viscosifier in a high TDS water.

Samples were prepared with (1) linear xanthan (known to viscosify high TDS fluids) at 60 lb/1,000 gal and (2) an ampholyte polymeric compound comprising a terpolymer of acrylamide, 2-acrylamido-2-methylpropane sulfonic acid, and acryloyloxy ethyl trimethyl ammonium chloride at 60 gal/1,000 gal, each in base fluids of (1) water and (2) salt water with an additional 3% KCl. The viscosity of each sample in were analyzed at 77° F. and 150° F. at a shear rate of 40 s$^{-1}$. FIG. 3 (water samples) illustrates that the ampholyte polymeric compound provides higher viscosity than linear xanthan in water. While FIG. 4 (salt water samples) illustrates that in a high TDS environment the ampholyte polymeric compound provides for a comparable viscosity to linear xanthan.

This example illustrates that treatment fluids can be viscosified to levels comparable to that of traditional viscosifying agents, including in high TDS fluids.

Therefore, the exemplary embodiments described herein are well adapted to attain the ends and advantages mentioned as well as those that are inherent therein. The particular embodiments disclosed above are illustrative only, as the exemplary embodiments described herein exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
introducing a treatment fluid into a wellbore penetrating a subterranean formation, wherein the treatment fluid comprises a base fluid and an ampholyte polymeric compound,
wherein the ampholyte polymeric compound comprises:
30-50% by weight of at least one nonionic monomer, wherein the nonionic monomer is acrylamide,
5-15% by weight of at least one sulfonic acid-containing monomer, wherein the sulfonic acid-containing monomer is 2-acrylamido-2-methylpropane sulfonic acid or a salt thereof, and
40-60% by weight of at least one cationic monomer, wherein the cationic acid-containing monomer is acryloyloxy ethyl trimethyl ammonium chloride, methacrylamidopropyltrimethyl ammonium chloride, or a combination thereof, and
wherein the ampholyte polymeric compound is present at about 1 v/v % to about 30 v/v % of the treatment fluid,
wherein the treatment fluid comprises 100,000 to 250,000 ppm of total dissolved solids, and
reducing the viscosity of the treatment fluid from 35-155 cP to less than 5 cP in 90 minutes or less, wherein the treatment fluid contains no, or less than about 1% of a, chemical breaker.

2. The method of claim 1 further comprising:
partially hydrolyzing the ampholyte polymeric compound.

3. The method of claim 1, wherein the treatment fluid further comprises a plurality of particulates.

4. The method of claim 3 further comprising:
forming a gravel pack comprising the particulates in an annulus within the wellbore.

5. A method comprising:
introducing a treatment fluid into a wellbore penetrating a subterranean formation at a pressure sufficient to create or extend at least one fracture in the subterranean formation,
wherein the treatment fluid comprises a first base fluid and a first ampholyte polymeric compound,
wherein the ampholyte polymeric compound comprises:
30-50% by weight of at least one nonionic monomer, wherein the nonionic monomer is acrylamide,
5-15% by weight of at least one sulfonic acid-containing monomer, wherein the sulfonic acid-containing monomer is 2-acrylamido-2-methylpropane sulfonic acid or a salt thereof, and
40-60% by weight of at least one cationic monomer, wherein the cationic acid-containing monomer is acryloyloxy ethyl trimethyl ammonium chloride, methacrylamidopropyltrimethyl ammonium chloride, or a combination thereof, and
wherein the ampholyte polymeric compound is present at about 2.5 v/v % to about 30 v/v % of the treatment fluid,
wherein the treatment fluid comprises 100,000 to 250,000 ppm of total dissolved solids, and
reducing the viscosity of the treatment fluid from at least 35 cP to less than 5 cP in 90 minutes or less, wherein the treatment fluid contains no, or less than about 1% of a, chemical breaker.

6. The method of claim 5 further comprising:
forming a particulate pack in the fracture with a second treatment fluid that comprises a second base fluid, a second ampholyte polymeric compound at a friction reducing concentration, a gas, a foaming agent, and a plurality of particulates.

7. The method of claim 6, wherein the second base fluid is the same as the first base fluid and the second ampholyte polymeric compound is the same as the first ampholyte polymeric compound.

8. A method comprising:
introducing a treatment fluid into a wellbore penetrating a subterranean formation, wherein the treatment fluid comprises a base fluid having from 100,000 to 250,000 ppm of total dissolved solids, and an ampholyte polymeric compound at about 5 v/v % to about 30 v/v % of the treatment fluid, the ampholyte polymeric compound comprising:
acrylamide monomer that is about 30% to about 50% by weight of the ampholyte polymeric compound,
2-acrylamido-2-methylpropane sulfonic acid monomer or a salt thereof that is about 5% to about 15% by weight of the ampholyte polymeric compound, and
acryloyloxy ethyl trimethyl ammonium chloride monomer that is about 40% to about 60% by weight of the ampholyte polymeric compound, and
reducing the viscosity of the treatment fluid from at least 35 cP to less than 5 cP in 90 minutes or less, wherein the treatment fluid contains no, or less than about 1% of a, chemical breaker.

* * * * *